(12) United States Patent
Nawa et al.

(10) Patent No.: US 6,625,549 B1
(45) Date of Patent: Sep. 23, 2003

(54) EQUIPMENT SPECIFYING SYSTEM

(75) Inventors: Motoyuki Nawa, Ikoma (JP); Mitsuo Nanba, Machida (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/786,924

(22) PCT Filed: Sep. 10, 1999

(86) PCT No.: PCT/JP99/04972

§ 371 (c)(1), (2), (4) Date: Aug. 1, 2001

(87) PCT Pub. No.: WO00/16044

PCT Pub. Date: Mar. 23, 2000

(30) Foreign Application Priority Data

Nov. 9, 1998 (JP) .............................. 10-258137

(51) Int. Cl.$^7$ .............................. G01F 11/00; G01F 1/66
(52) U.S. Cl. ................... 702/51; 73/861.22; 73/861.28; 73/861.29; 702/50
(58) Field of Search .............................. 702/45, 50, 51, 702/55; 73/861.28, 861.27, 861.29, 861.31, 861.22

(56) References Cited

U.S. PATENT DOCUMENTS 5,506,791 A * 4/1996 Hungerford et al. .......... 702/50
6,065,351 A * 5/2000 Nagaoka et al. ......... 73/861.28

FOREIGN PATENT DOCUMENTS

JP          7198688          8/1995

* cited by examiner

Primary Examiner—John Barlow
Assistant Examiner—John Le
(74) Attorney, Agent, or Firm—Snell & Wilmer, LLP

(57) ABSTRACT

An equipment specifying system of the present invention includes: a flow path for supplying gas to a plurality of pieces of equipment; an ultrasonic propagation signal measuring section for measuring a propagation signal based on a time during which an ultrasonic wave propagates across the flow path; a signal pattern generation section for generating a signal pattern based on a change in a propagation signal; a signal pattern storage section for previously storing a plurality of signal patterns respectively corresponding to a plurality of pieces of equipment; a signal pattern comparison section for comparing a signal pattern generated by the signal pattern generation section with a plurality of signal patterns previously stored in the signal pattern storage section; and an equipment specifying section for specifying currently used equipment among a plurality of pieces of equipment, in accordance with the comparison results obtained by the signal pattern comparison section.

10 Claims, 15 Drawing Sheets

EQUIPMENT SPECIFYING SYSTEM

TECHNICAL FIELD

The present invention relates to an equipment specifying system for specifying equipment often used by a user among a plurality of pieces of equipment to which gas is supplied through a single flow path.

BACKGROUND ART

In the past, a system has been known, which is capable of distinguishing ignition of a gas unit from gas leakage in accordance with a change in a flow rat& of gas flowing through a flow path. For example, Japanese Laid-Open Publication No. 9-304134 describes this type of system.

FIG. 1 shows a structure of the system described in Japanese Laid-Open Publication No. 9-304134. The system shown in FIG. 1 includes flow rate measuring means 1, flow rate pattern indicator calculation means 2, pattern recognition means 3, and storage means 4.

The flow rate measuring means 1 measures a flow rate of gas flowing through a flow path, and outputs a flow rate measuring signal representing the measured flow rate to the flow rate pattern indicator calculation means 2. The flow rate pattern indicator calculation means 2 creates a flow rate pattern indicator of gas flowing through the flow path, based on the flow rate measuring signal. The storage means 4 previously stores a plurality of basic flow rate pattern indicators. The pattern recognition means 3 compares the flow rate pattern indicator created by the flow rate pattern indicator calculation means 2 with a plurality of flow rate pattern indicators previously stored in the storage means 4, thereby determining whether a change in a flow rate of gas flowing through the flow path is based on ignition of a gas unit or gas leakage.

The above-mentioned conventional system is predicated upon measurement of a flow rate of gas flowing through a flow path. Measurement of a flow rate of gas generally requires some calculation processing with respect to a signal output from a sensor. In the case where a flow rate of gas is changed at high speed (e.g., in the case where a gas flow is in a transient state), the number of data to be sampled is not sufficient, so that measurement of a flow rate of gas does not follow a high-speed change in a flow rate of gas.

DISCLOSURE OF THE INVENTION

An equipment specifying system of the present invention, includes: a flow path for supplying gas to a plurality of pieces of equipment, an ultrasonic propagation signal measuring section for measuring a propagation signal based on a time during which an ultrasonic wave propagates across the flow path: a signal pattern generation section for generating a signal pattern based on a change in the propagation signal; a signal pattern storage section for previously storing a plurality of signal patterns respectively corresponding to the plurality of pieces of equipment; a signal pattern comparison section for comparing the signal pattern generated by the signal pattern generation section with the plurality of signal patterns previously stored in the signal pattern storage section; and an equipment specifying section for specifying currently used equipment among the plurality of pieces of equipment, in accordance with the comparison results obtained by the signal pattern comparison section.

In one embodiment of the present invention, the equipment specifying system further includes a use time limit setting section for setting a use time limit to the specified equipment.

In another embodiment of the present invention, the equipment specifying system further includes an equipment use time storage section for storing a use time of the specified equipment.

In another embodiment of the present invention, the ultrasonic propagation signal measuring section includes a first ultrasonic transducer and a second ultrasonic transducer, and the propagation signal represents a difference (T2−T1) between a propagation time T1 during which an ultrasonic wave propagates from the first ultrasonic transducer to the second ultrasonic transducer across the flow path and a propagation time T2 during which an ultrasonic wave propagates from the second ultrasonic transducer to the first ultrasonic transducer across the flow path.

In another embodiment of the present invention, the ultrasonic propagation signal measuring section includes a first ultrasonic transducer and a second ultrasonic transducer, and the propagation signal represents one of a propagation time T1 during which an ultrasonic wave propagates from the first ultrasonic transducer to the second ultrasonic transducer across the flow path and a propagation time T2 during which an ultrasonic wave propagates from the second ultrasonic transducer to the first ultrasonic transducer across the flow path.

In another embodiment of the present invention, the ultrasonic propagation signal measuring section is controlled so that a frequency of measuring the propagation signal is increased, in response to a detection of a change in the propagation signal.

In another embodiment of the present invention, in a case where the signal pattern generated by the signal pattern generation section does not match with any of the plurality of signal patterns stored in the signal pattern storage section, the signal pattern comparison section requests a user to store the signal pattern generated by the signal pattern generation section in the signal pattern storage section In another embodiment of the present invention, in a case where the signal pattern generated by the signal pattern generation section does not match with any of the plurality of signal patterns stored in the signal pattern storage section, the signal pattern comparison section automatically stores the signal pattern generated by the signal pattern generation section in the signal pattern storage section.

In another-embodiment of the present invention, in a case where the signal pattern generated by the signal pattern generation section does not match with any of the plurality of signal patterns stored in the signal pattern storage section, the signal pattern comparison section conducts a gas leakage check.

Thus, the invention described herein makes possible the advantage of providing an equipment specifying system which is capable of specifying currently used equipment, by utilizing a propagation signal based on a time during which an ultrasonic wave propagates across a flow path, without utilizing a flow rate measuring signal.

BEST MODE FOR CARRYING OUT THE INVENTION

Hereinafter, the present invention will be described by way of illustrative embodiments with reference to the drawings.

Embodiment 1

Figure 1:
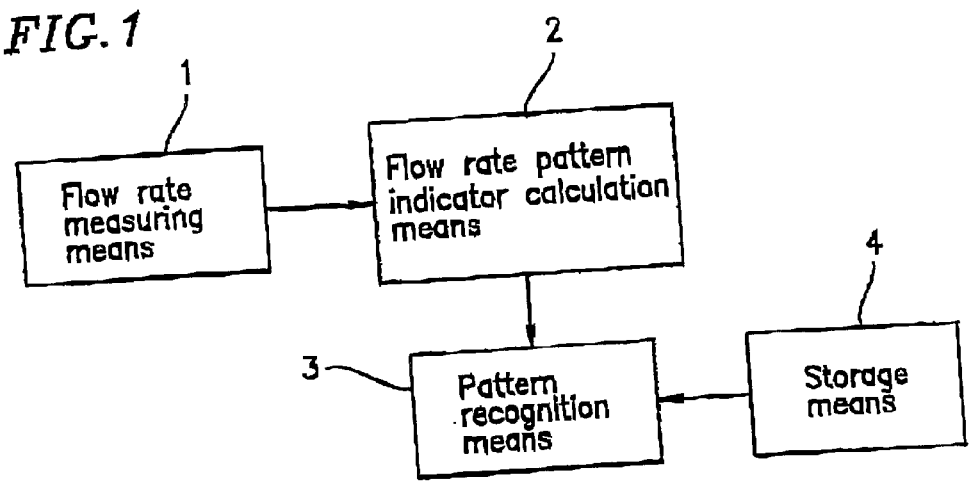
FIG. 1 is a block diagram showing a structure of a conventional system.
Figure 2:
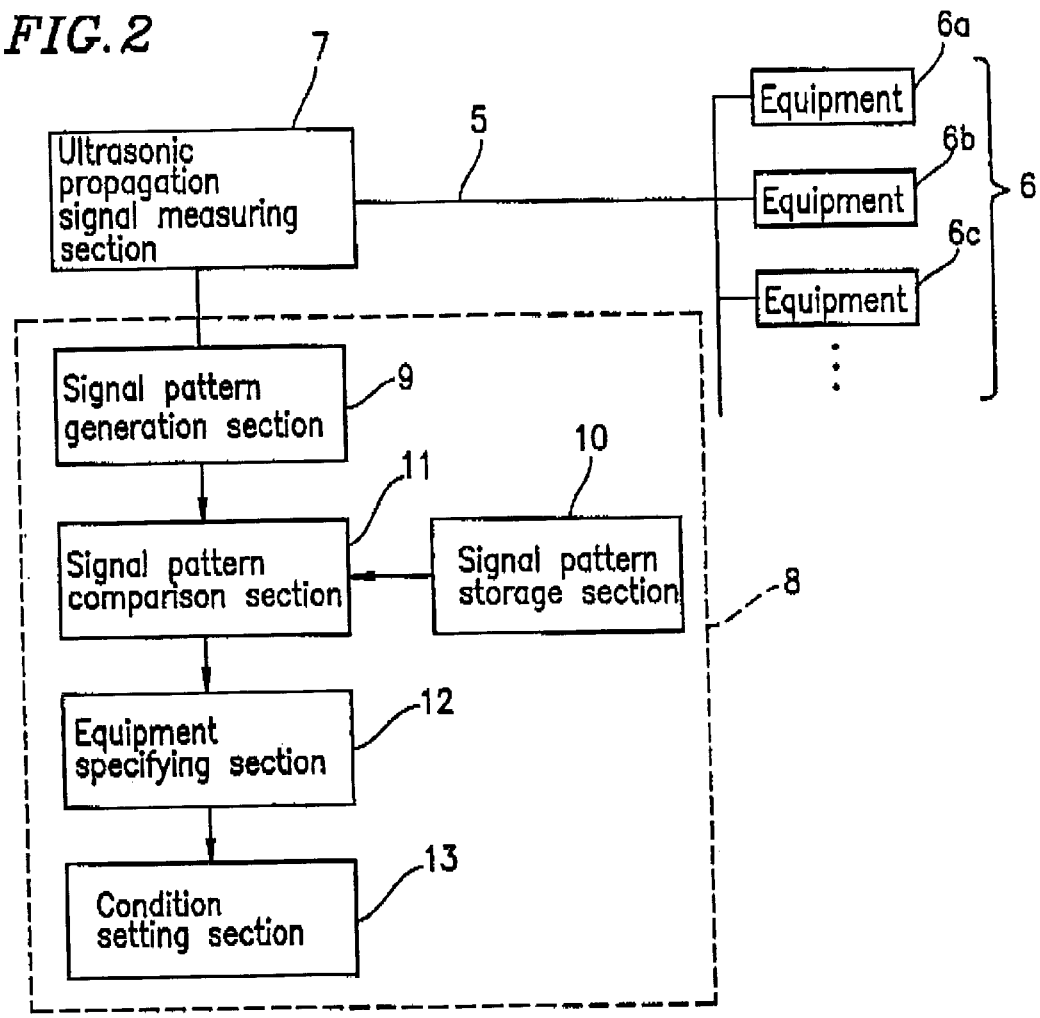
FIG. 2 is a block diagram showing a structure of an equipment specifying system of Embodiment 1 according to the present invention.

FIG. 2 shows a structure of an equipment specifying system of Embodiment 1 according to the present invention.

As shown in FIG. 2, the equipment specifying system includes a flow path 5 for supplying gas to a plurality of pieces of equipment 6 (e.g., three pieces of equipment 6a, 6b, and 6a), an ultrasonic propagation signal measuring section 7 for measuring a propagation signal based on a time during which an ultrasonic wave propagates across the flow path 5, and a calculation section 8 for calculating the propagation signal measured by the ultrasonic propagation signal measuring section 7.

The calculation section 8 includes a signal pattern generation section 9 for generating a signal pattern based on a change in a propagation signal, a signal pattern storage section 10 for previously storing a plurality of signal patterns respectively corresponding to a plurality of pieces of equipment 6, a signal pattern comparison section 11 for comparing the signal pattern generated by the signal pattern generation section 9 with a plurality of signal patterns previously stored in the signal pattern storage section 10, an equipment specifying section 12 for specifying currently used equipment among a plurality of pieces of equipment, in accordance with the comparison results obtained by the signal pattern comparison section 11, and a condition setting section 13 for setting a condition corresponding to the specified equipment.

Figure 15A:
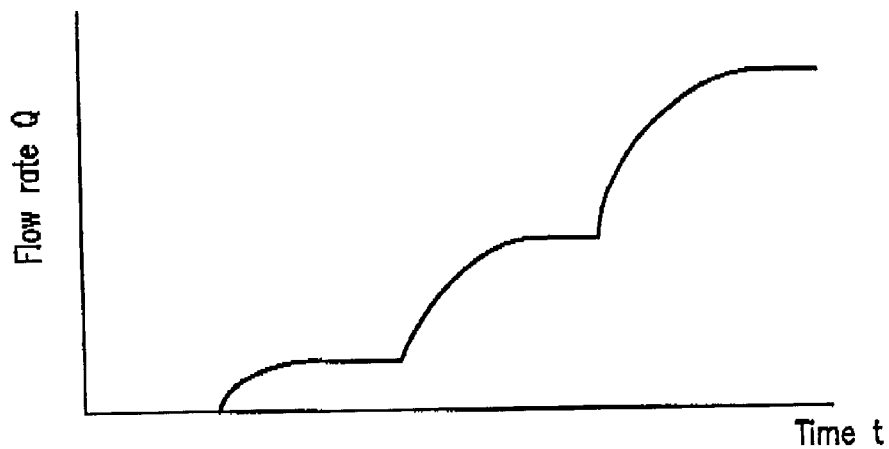
FIG. 15A is a graph showing an example of a change in flow rate of a gas flowing through a flow path.

FIG. 15A shows an example of a change in a flow rate Q of gas flowing through the flow path 5. For example, when the equipment 6 is used, the flow rate Q is changed as shown in FIG. 15A. When the flow rate Q is changed, a propagation signal to be measured by the ultrasonic propagation signal measuring section 7 is changed. The signal pattern generation section 9 generates a signal pattern, based on the change in the propagation signal.

Figure 15B:
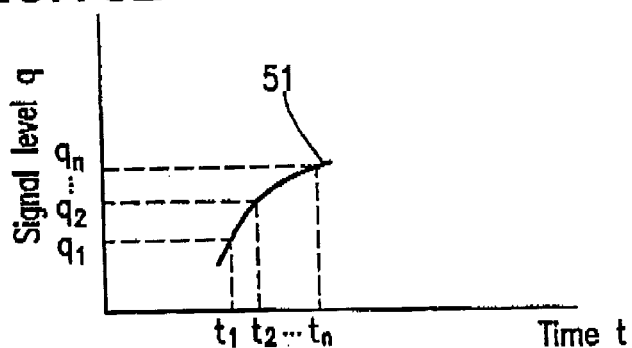
FIG. 15B is a graph showing an example of a signal pattern generated by a signal pattern generation section.

FIG. 15B shows an example of a signal pattern 51 generated by the signal pattern generation section 9. In the example shown in FIG. 15B, the signal pattern 51 is obtained by approximating n pieces of measurement data $(t_1, q_1), (t_2, q_2), \ldots (t_n, q_n)$ measured by the ultrasonic propagation signal measuring section 7 to a straight line or a curve. Herein, $(t_k, q_k)$ (k=1, 2, ..., n) represents a signal level $q_k$ of the propagation signal measured at a time $t_k$.

Figure 15C:
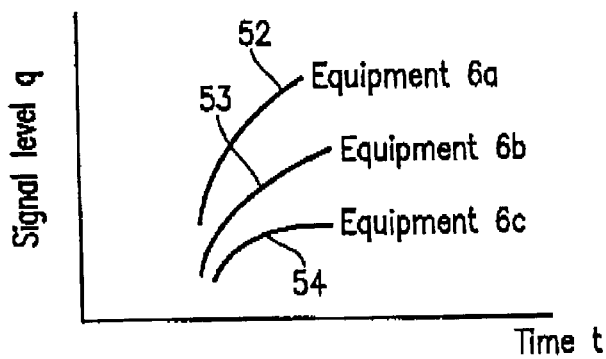
FIG. 15C is a graph showing examples of signal patterns previously stored in a signal pattern storage section.

FIG. 15C shows examples of signal patterns 52 to 54 previously stored in the signal pattern storage section 10. The signal patterns 52 to 54 respectively correspond to the equipment 6a to 6c.

In the case where the signal pattern 51 generated by the signal pattern generation section 9 matches with one of the signal patterns 52 to 54 previously stored in the signal pattern storage section 10, the equipment specifying section 12 specifies the equipment 6 (e.g., equipment 6b) corresponding to the matched signal pattern as the currently used equipment. Matching/mismatching of signal patterns can be determined by any pattern matching method. Furthermore, in the case where similarity between the signal pattern 51 and one of the signal patterns 52 to 54 is a predetermined value or more, the signal pattern 51 may be considered to match with one of the signal patterns 52 to 54. Such similarity can be calculated in accordance with a predetermined rule.

In the case where the signal pattern 51 does not match with any of the signal patterns 52 to 54, the signal pattern comparison section 11 determines that "there is no corresponding equipment". In this case, the signal pattern comparison section 11 may request a user to store the signal pattern 51 corresponding to new equipment in the signal pattern storage section 10. Alternatively, the signal pattern comparison section 11 may automatically store the signal pattern 51 corresponding to new equipment in the signal pattern storage section 10. Alternatively, the signal pattern comparison section 11 may assume that gas is leaking from some portion of the flow path 5 and may inform a user of gas leakage, or may conduct gas leakage check.

Figure 3:
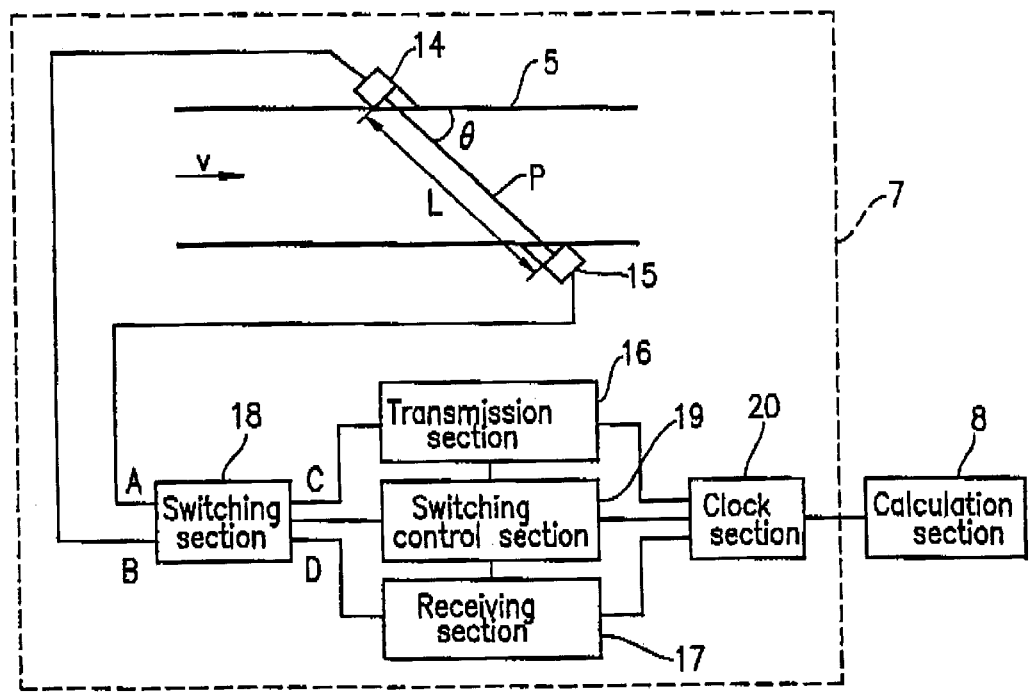
FIG. 3 is a block diagram showing a structure of an ultrasonic propagation signal measuring section in the equipment specifying system of Embodiment 1 according to the present Invention.

FIG. 3 shows a structure of the ultrasonic propagation signal measuring section 7 shown in FIG. 2.

The ultrasonic propagation signal measuring section 7 includes a pair of ultrasonic transducers 14 and 15 disposed with the flow path 5 interposed therebetween, a transmission section 16, a receiving section 17, a switching section 18, a switching control section 19, and a clock section 20.

Next, the ultrasonic propagation signal measuring section 7 will be described in detail with reference to FIG. 3.

First, a method for measuring a flow rate of gas flowing through the flow path 5 will be described. The switching section 18 has terminals A through D. The connection relationship among the terminals A through D in the switching section 18 can be changed by the switching control section 19.

Initially, the terminal B of the switching section 18 is connected to the terminal C, and the terminal A of the switching section 18 is connected to the terminal D. In this case, a signal transmitted from the transmission section 16 is input to the ultrasonic transducer 14 through the terminals C and B of the switching section 18. An ultrasonic wave output from the ultrasonic transducer 14 reaches the ultrasonic transducer 15 across the flow path 5. A signal output from the ultrasonic transducer 15 is received by the receiving section 17 via the terminals A and D of the switching section 18.

The transmission section 16 transmits a signal to the ultrasonic transducer 14 via the switching section 18 while outputting the signal to the clock section 20. The receiving section 17 receives the signal output from the ultrasonic transducer 15 via the switching section 18 and simultaneously outputs the received signal to the clock section 20. The clock section 20 measures a time difference between these signals. Thus, a propagation time (T1) is obtained, during which an ultrasonic wave output from the ultrasonic transducer 14 traverses the flow path 5 to reach the ultrasonic transducer 15.

Next, the connection relationship among the terminals A through D of the switching section 18 is changed. More specifically, the terminal A of the switching section 18 is connected to the terminal C, and the terminal B of the switching section 18 is connected to the terminal D. Thus, a propagation time (T2) is obtained, during which an ultrasonic wave output from the ultrasonic transducer 15 traverses the flow path 7 to reach the ultrasonic transducer 14.

A flow rate of gas flowing in the flow path 5 is computed by the following calculation formula, using the propagation times T1 and T2 thus measured.

Herein, it is assumed that an angle formed by a flow of gas to be measured and an ultrasonic propagation path P in θ, a distance between the ultrasonic transducer 14 and the ultrasonic transducer 15 is L, and a sound velocity is σ.

The propagation times T1 and T2 are computed In accordance with the following Formulae (1) and (2).

$$T1 = L/(c + v(\cos\theta)) \quad (1)$$

$$T2 = L/(c - v(\cos\theta)) \quad (2)$$

A flow velocity v is computed in accordance with Formula (3) by erasing the sound velocity a from Formulae (1) and (2).

$$v = (L/2\cos\theta)((1/T1) - (1/T2)) \quad (3)$$

A flow rate Q is computed in accordance with Formula (4).

$$Q = kvS \quad (4)$$

In Formula (4), k is a correction coefficient for obtaining an average flow velocity, and S is a cross-sectional area of the flow path 5.

Herein, Formula (3) for computing the flow velocity v has two reverse number calculation processing. Two reverse number calculation processings require a long calculation time. Therefore, it takes a long time to compute the flow rate Q in accordance with Formulae (3) and (4). It is considered that Formula (3) is simplified.

By modifying Formula (3), Formula (5) is obtained.

$$v = (L/2\cos\theta)((T2 - T1)/(T1)(T2)) \quad (5)$$

From Formulae (1) and (2), T1 and T2 are expressed in accordance with Formula (6).

$$(T1)(T2) = L^2/(c^2 - v^2(\cos\theta)^2) \quad (6)$$

Assuming that v<<c, Formula (6) is approximated to Formula (7).

$$(T1)(T2) \approx (L/C)^2 \quad (7)$$

From Formulae (5) and (7), Formula (8) is obtained.

$$v \approx (c^2/2L\cos\theta)(T2 - T1) \quad (8)$$

It is understood from Formula (8) that the flow velocity v is substantially proportional to (T2−T1).

The relationship between the flow rate Q and the flow velocity v is defined by Formula (4). It is understood from Formulae (4) and (8) that the behavior of the flow rate Q can be investigated by measuring a propagation signal representing the difference (T2−T1) between the propagation times T1 and T2, instead of investigating the flow rate Q itself.

Herein, a method for obtaining the propagation times T1 and T2 by single measurement has been described: specifically, a method has been described, for obtaining the propagation times T1 and T2 by transmitting an ultrasonic wave from an upstream side to a downstream side of the flow path 5, and transmitting an ultrasonic wave from a downstream side to an upstream side of the flow path 5, respectively. However, In order to enhance measurement precision, a method called "Sing around" for repeating transmission and receiving of an ulreasonic wave may be adopted. In this case, an average of a plurality of measured propagation times should be adopted as the propagation times T1 and T2, respectively.

Figure 4:
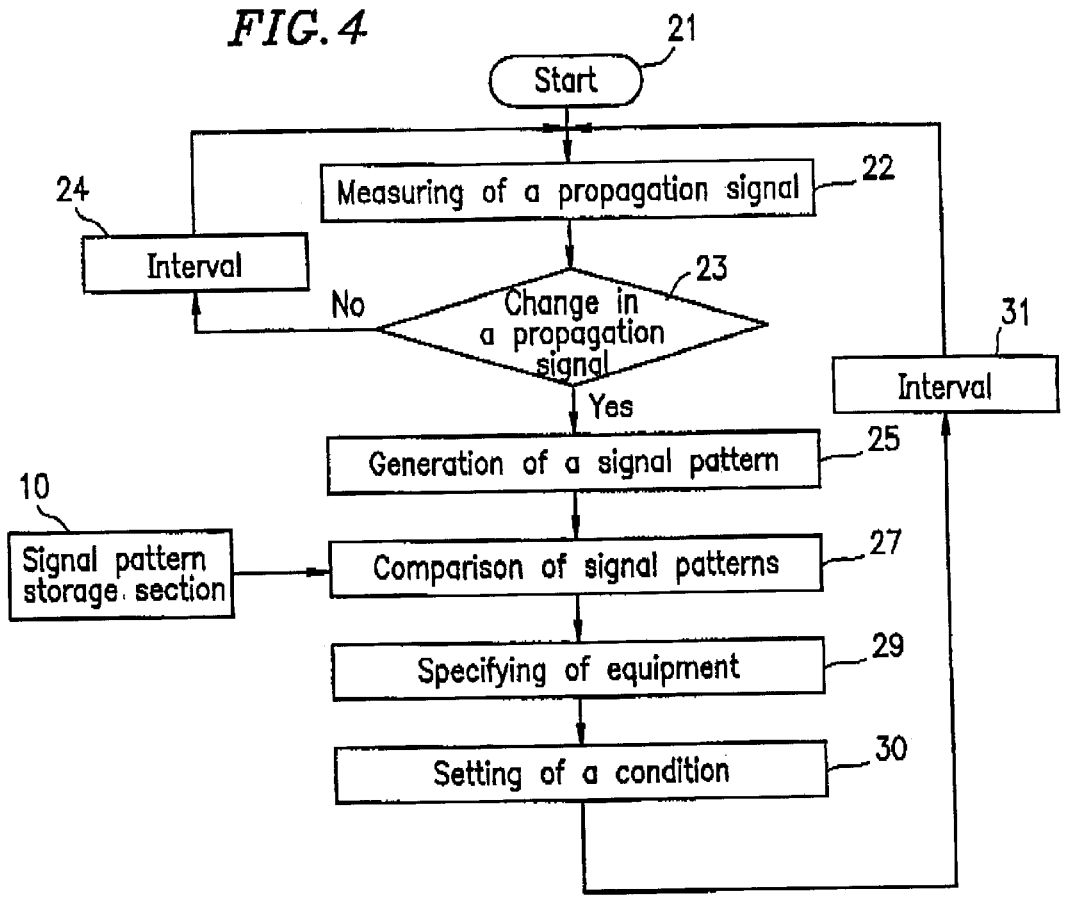
FIG. 4 is a flow chart showing a procedure of processing which is performed by a calculation section in the equipment specifying system of Embodiment 1 according to the present invention.

FIG. 4 is a flow chart showing a procedure of processing performed by the calculation section 8 shown in FIGS. 2 and 3.

In FIG. 4, reference numeral 21 denotes a start instruction, reference numeral 22 denotes a propagation signal measuring instruction, reference numeral 23 denotes a propagation signal change determination instruction, reference numeral 24 denotes an interval setting instruction, reference numeral 25 denotes a signal pattern generating instruction, reference numeral 27 denotes a signal pattern comparison instruction, reference numeral 29 denotes an equipment specifying instruction, reference numeral 30 denotes a condition setting instruction, and reference numeral 31 denotes an interval setting instruction.

The signal pattern generating instruction 25 corresponds to the signal pattern generation section 9 (FIG. 2), and the signal pattern comparison instruction 27 corresponds to the signal pattern comparison section 11 (FIG. 2).

As shown in FIG. 4, a program is stared by the start instruction 21. A propagation signal representing the difference (T2−T1) between the propagation times T1 and T2 is measured by the propagation signal measuring instruction 22.

It is determined by the propagation signal change determination instruction 23 whether or not a propagation signal is changed. When any one of a plurality of pieces of equipment 6 is used, a gas flow in the flow path 5 is changed, which changes a propagation signal. In the case where the propagation signal is changed, "Yes" is selected. In the case where the propagation signal is not changed, "No" is selected, and after a time set by the interval setting instruction 24 elapses, the above-mentioned process is repeatedly performed.

Next, a signal pattern in generated by the signal pattern generation instruction 25 based on a change in the propagation signal. For example, the signal pattern represents a standing waveform of the propagation signal. The signal pattern generated by the signal pattern generation instruction 25 is compared with a plurality of signal patterns previously stored in the signal pattern storage section 10 by the signal pattern comparison instruction 27. A plurality of signal patterns are used as basic signal patterns respectively corresponding to a plurality of pieces of equipment 6. Currently used equipment 6 (e.g., equipment 6a) is specified among a plurality of pieces of equipment 6 by the equipment specifying instruction 29, based on the comparison results obtained by the signal pattern comparison instruction 27. A condition corresponding to the specified equipment is set by the condition setting instruction 30. After a time set by the interval setting instruction 31 elapses, the above-mentioned process is repeatedly performed.

As described above, by utilizing a propagation signal representing the difference (T2−T1) between the propagation times T1 and T2, instead of utilizing a flow rate measuring signal, calculation processing can be simplified. As a result, a change in flow rate of a gas flowing through the flow path 5 can be detected at high speed. This allows transient data to be measured in detail, and equipment to be specified with good precision.

Embodiment 2

Figure 6:
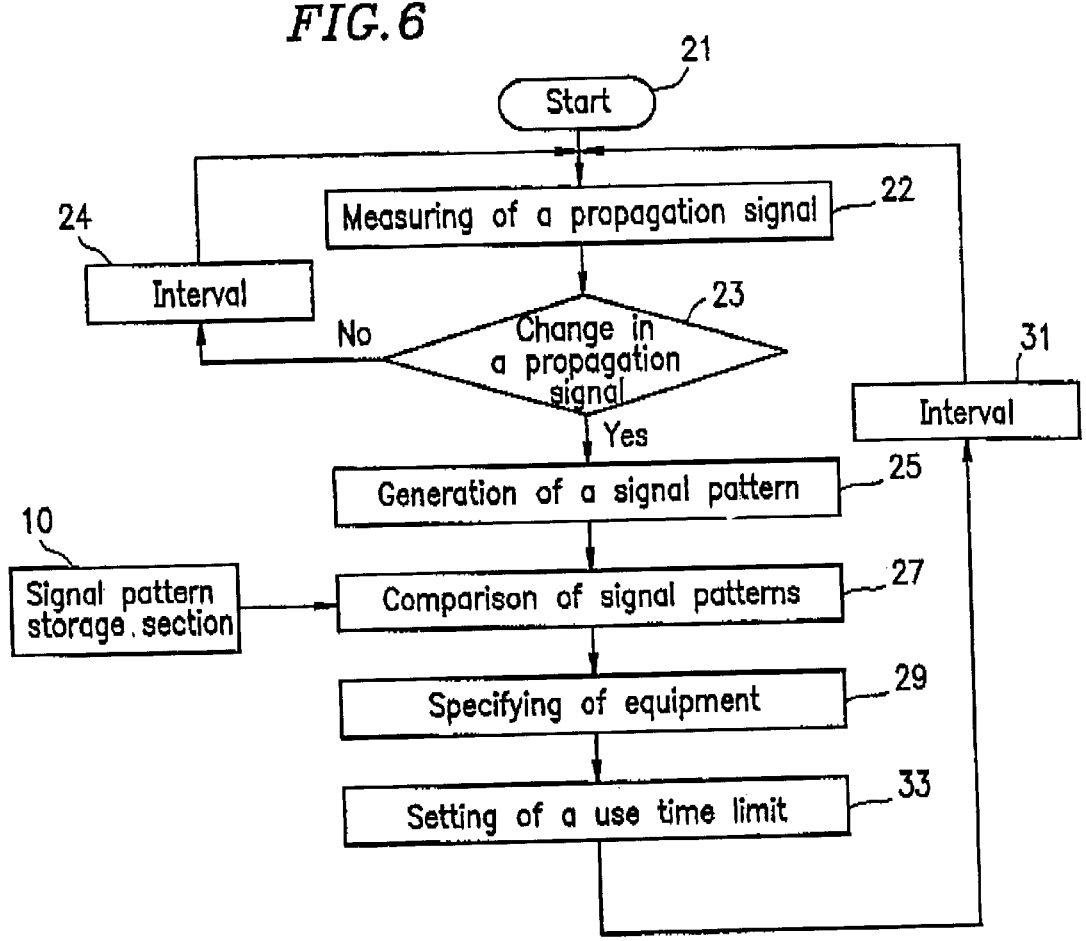
FIG. 6 is a flow chart showing a procedure of processing which is performed by a calculation section in the equipment specifying system of Embodiment 2 according to the present invention.

FIG. 6 shows a structure of an equipment specifying system of Embodiment 2 according to the present invention.

Figure 5:
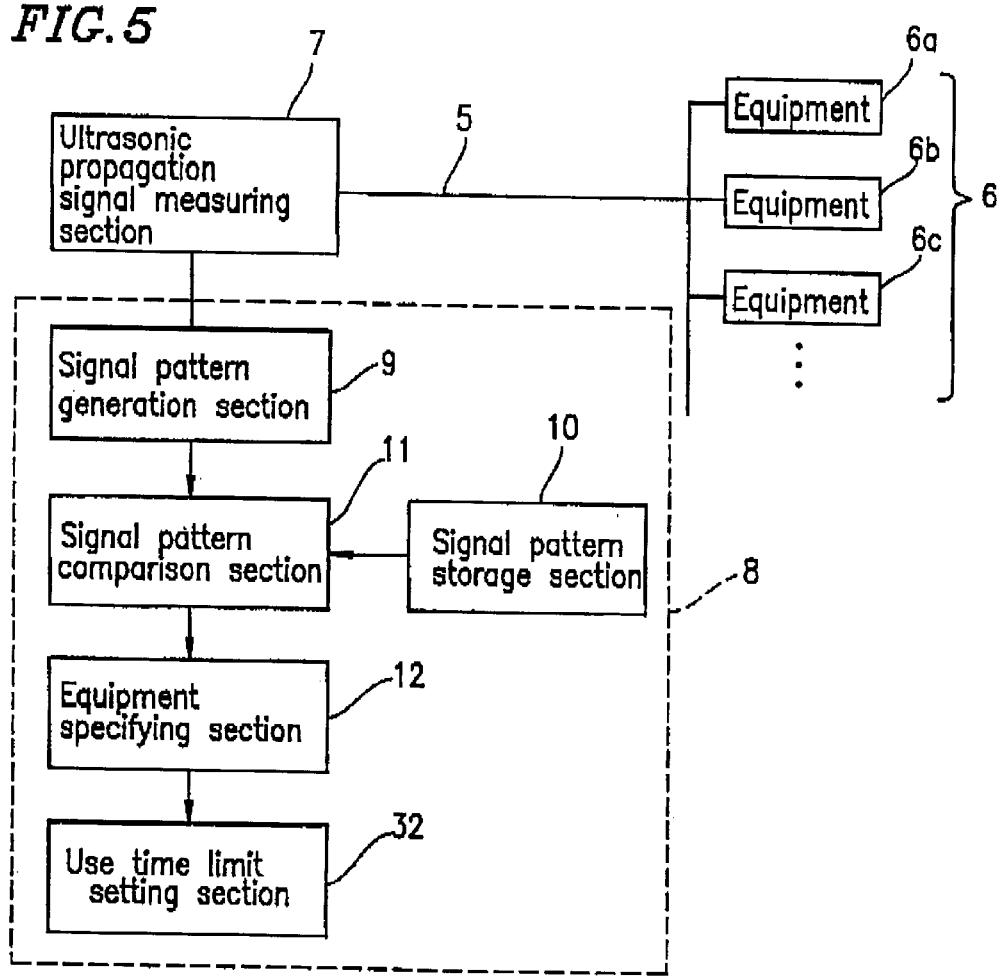
FIG. 5 is a block diagram showing a structure of an equipment specifying system of Embodiment 2 according to the present invention.

In FIG. 5, the same components as those in FIG. 2 are denoted with the same reference numerals as those therein. Thus, their description will be omitted here. Furthermore, the structure of the ultrasonic propagation signal measuring section 7 is the same as that shown in FIG. 3.

The calculation section 8 includes a use time limit setting section 32 for setting a use time limit to the currently used equipment 6 among a plurality of pieces of equipment 6.

FIG. 6 shows a procedure of processing which is performed by the calculation section 8 shown in FIG. 5. The processing shown in FIG. 6 is the same as that shown in FIG. 4 except for a use time limit setting instruction 33, A use time limit is set to the specified equipment by the use time limit setting instruction 33.

Accordingly, by setting a use time limit to the specified equipment, safe equipment use environment can be set. For example, in the case where a small hot-water supply unit of an indoor setting type is specified as the currently used equipment, a use time limit is set to be short, which contributes to prevention of an accident of CO intoxication.

Embodiment 3

Figure 7:
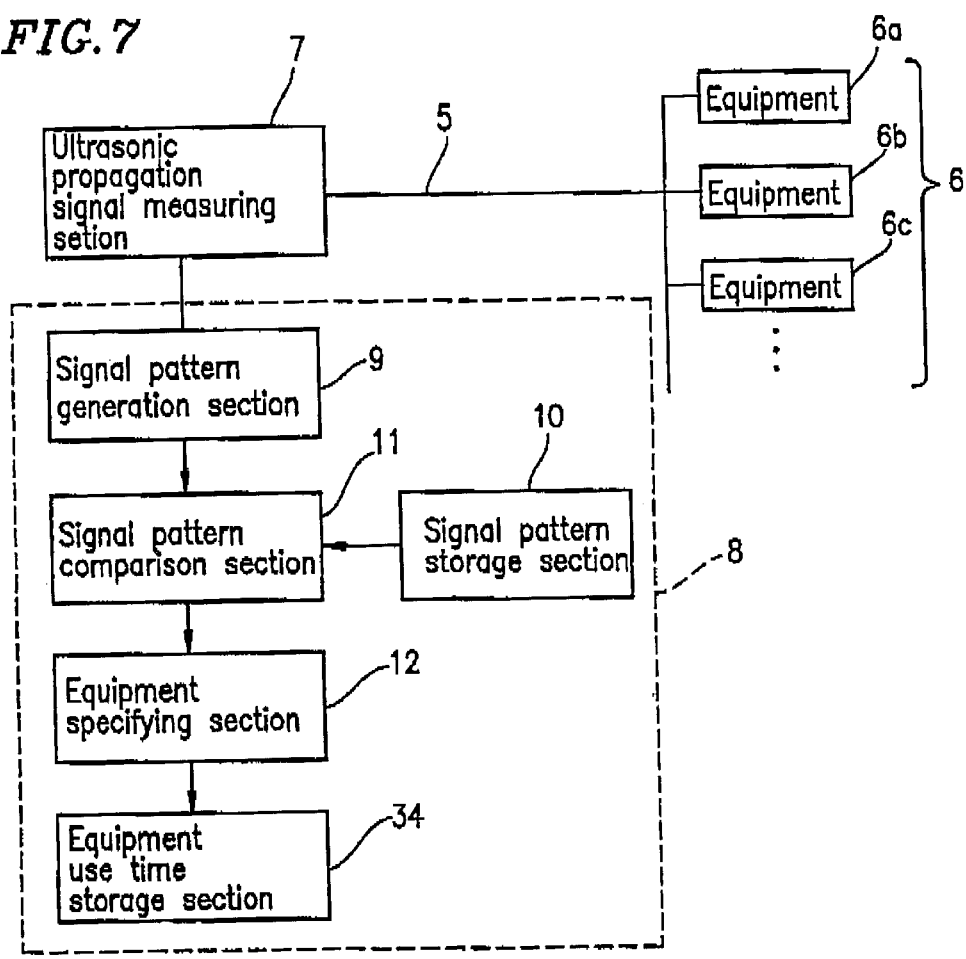
FIG. 7 is a block diagram showing a structure of an equipment specifying system of Embodiment 3 according to the present invention.

FIG. 7 shows a structure of an equipment specifying system of Embodiment 3 according to the present invention.

In FIG. 7, the same components as those in FIG. 2 are denoted with the same reference numerals as those therein. Thus, their description will be omitted here. The structure of the ultrasonic propagation signal measuring section 7 is the same as that shown in FIG. 3.

The calculation section 8 includes an equipment use time storage section 34 for storing a use time of the currently used equipment 6 among a plurality of pieces of equipment 6.

Figure 8:
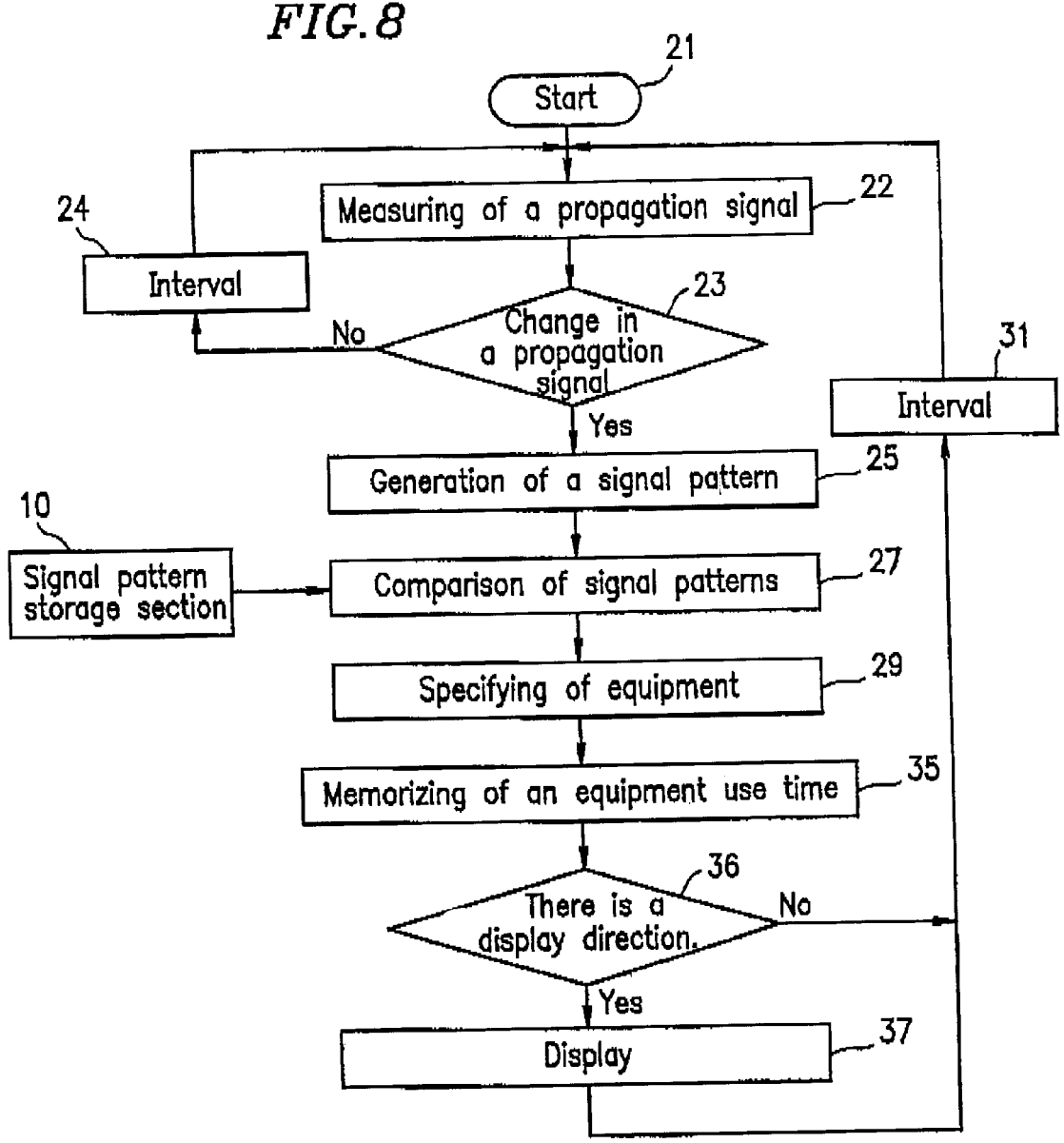
FIG. 8 is a flow chart showing a procedure of processing which is performed by a calculation section in the equipment specifying system of Embodiment 3 according to the present invention.

FIG. 8 shows a procedure of processing which is performed by the calculation section 8 shown in FIG. 7. The processing shown in FIG. 8 is the same as that shown in FIG. 4 except for an equipment use time storage instruction 35, a display direction determination instruction 36, and a display instruction 37.

A use time of the specified equipment is stored by the equipment use time storage instruction 35. It is determined by the display direction determination instruction 36 whether or not the use time of the specified equipment is displayed. In the case where there is a display direction, "Yes" is selected, and the use time of the specified equipment is displayed by the display instruction 37. In the case where there is no display instruction, "No" is selected, and after a time set by the interval setting instruction 31 elapses, the above-mentioned process is repeatedly performed.

Accordingly, by storing the use time of the specified equipment, a state where the specified equipment is used can be obtained, and a function of billing with respect to the specified equipment and the like can be realized.

Embodiment 4

In Embodiment 1, the case has been described where a propagation signal representing the difference (T2−T1) between the propagation times T1 and T2 is measured in order to investigate the behavior of the flow rate Q. However, in this case, it is required to measure both the propagation times T1 and T2. In Embodiment 4, a method for further simplifying this measurement will be described.

From Formula (1), the flow velocity v is represented by Formula (9) as follows.

$$v=(1/\cos\theta)((L/T1)-c) \qquad (9)$$

From Formula (2), the flow velocity v is represented by Formula (10) as follows.

$$v=(1/\cos\theta)((L/T2)+c) \qquad (10)$$

In the case where the type of gas flowing through the flow path 5 is determined, the sound velocity c is known. Furthermore, the angle θ and the distance L are also known. Thus, by measuring the propagation time T1 or T2, the flow velocity v is determined in accordance with Formulae (9) or (10). The flow velocity v is inversely proportional to the propagation time T1 or T2.

Considering that the relationship between the flow rate Q and the flow velocity v is defined by Formula (4), it is understood that the behavior of the flow rate Q can be investigated by measuring a propagation signal representing the propagation time T1 or a propagation signal representing the propagation time T2, instead of investigating the flow rate Q itself.

The structure of the equipment specifying system of Embodiment 4 according to the present invention is the same as that of Embodiment 1. Thus, its description will be omitted here.

Figure 9:
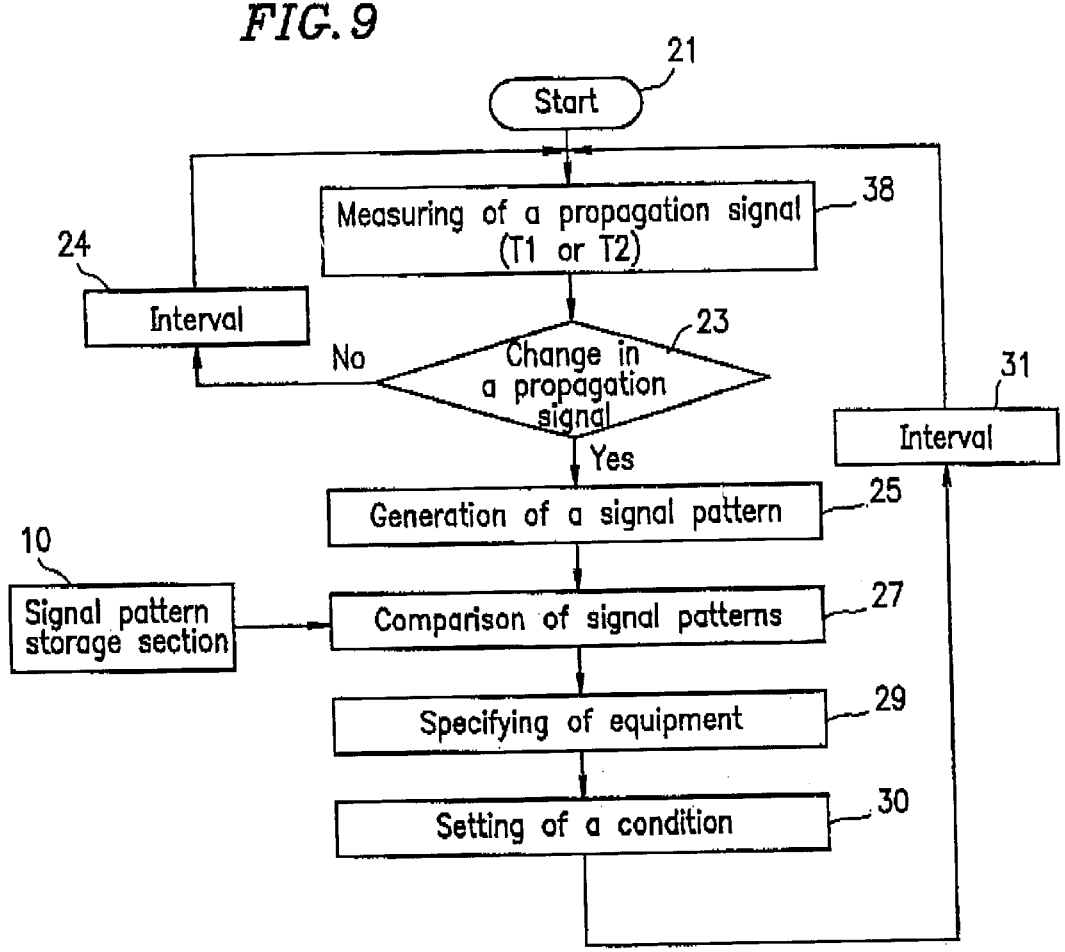
FIG. 9 is a flow chart showing a procedure of processing which is performed by a calculation section in an equipment specifying system of Embodiment 4 according to the present invention.

FIG. 9 shows a procedure of processing which is performed by the calculation section 8 in the equipment specifying system of Embodiment 4 according to the present invention. The processing shown in FIG. 9 is the same as that shown in FIG. 4 except for a propagation signal measuring instruction 38.

A propagation signal representing the propagation time T1 is measured by the propagation signal measuring instruction 38. Alternatively, a propagation signal representing the propagation time T2 may be measured instead of measuring a propagation signal representing the propagation time T1.

As described above, by utilizing a propagation signal representing the propagation time T1 or a propagation signal representing the propagation time T2, instead of utilizing a flow rate measuring signal, calculation processing can be simplified. As a result, a change in flow rate of a gas flowing through the flow path 5 can be detected at high speed. This allows transient data to be measured in detail, and equipment to be specified with good precision.

Depending upon the type of gas flowing through the flow path 5, the sound velocity a may be changed in accordance with a temperature. In such a case, it is preferable that the sound velocity a is previously obtained in accordance with Formula (11). Formula (11) is obtained by erasing the flow velocity v from Formulae (1) and (2).

$$\sigma = (L/2)((1/T1)+(1/T2)) \tag{11}$$

Embodiment 5

The structure of an equipment specifying system of Embodiment 5 according to the present invention is the same as that of Embodiment 2. Thus, its description will be omitted here.

Figure 10:
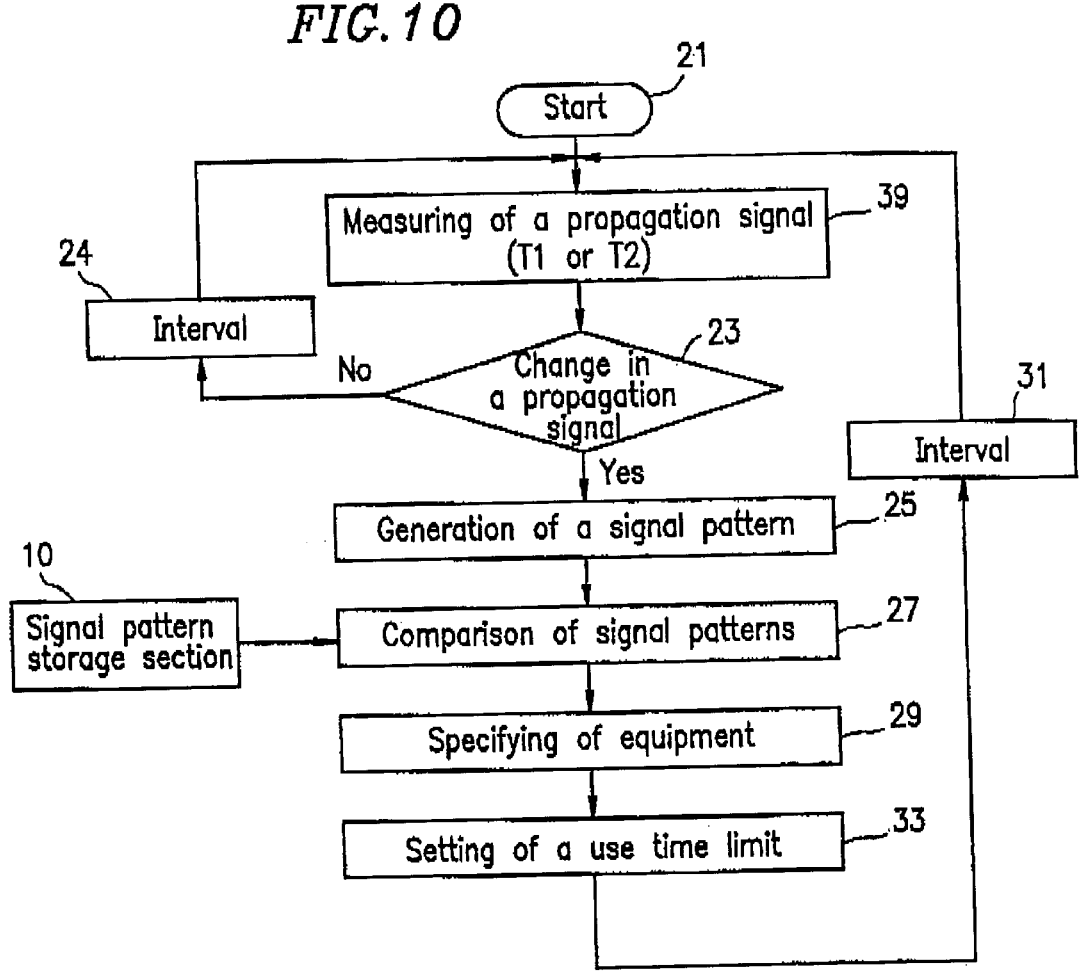
FIG. 10 is a flow chart showing a procedure of processing which is performed by a calculation section in an equipment specifying system of Embodiment 5 according to the present invention.

FIG. 10 shows a procedure of processing which is performed by the calculation section 8 in the equipment specifying system of Embodiment 5 according to the present invention. The processing shown in FIG. 10 is the same as that shown in FIG. 6 except for a propagation signal measuring instruction 39.

A propagation signal representing the propagation time T1 is measured by the propagation signal measuring instruction 39. Alternatively, a propagation signal representing the propagation time T2 may be measured instead of measuring a propagation signal representing the propagation time T1.

As described above, by utilizing a propagation signal representing the propagation time T1 or a propagation signal representing the propagation time T2, instead of utilizing a flow rate measuring signal, calculation processing can be simplified. As a result, a change in flow rate of a gas flowing through the flow path 5 can be detected at high speed. This allows transient data to be measured in detail, and equipment to be specified with good precision. Furthermore, by setting a use time limit to the specified equipment, a safe equipment use environment can be set.

Embodiment 6

The structure of an equipment specifying system of Embodiment 6 according to the present invention is the same as that of Embodiment 3. Thus, its description will be omitted here.

Figure 11:
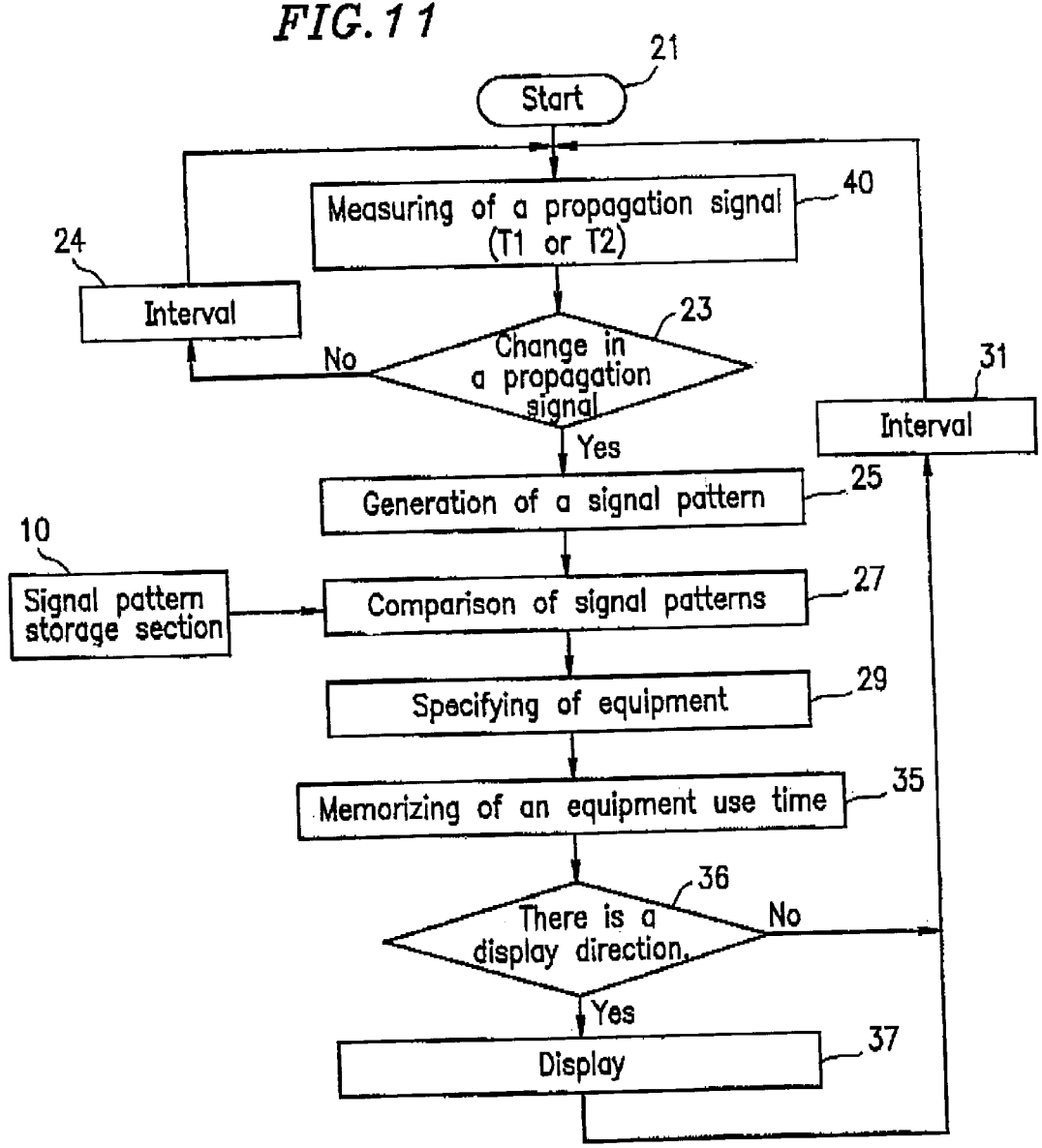
FIG. 11 is a flow chart showing a procedure of processing which is performed by a calculation section in an equipment specifying system of Embodiment 6 according to the present invention.

FIG. 11 shows a procedure of processing which is performed by the calculation section 8 in the equipment specifying system of Embodiment 6 according to the present invention. The processing shown in FIG. 11 is the same as that shown in FIG. 8 except for a propagation signal measuring instruction 40.

A propagation signal representing a propagation time T1 is measured by the propagation signal measuring instruction 40. Alternatively, a propagation signal representing the propagation time T2 may be measured instead of measuring a propagation signal representing the propagation time T1.

As described above, by utilizing a propagation signal representing the propagation time T1 or a propagation signal representing the propagation time T2, instead of utilizing a flow rate measuring signal, calculation processing can be simplified. As a result, a change in flow rate of a gas flowing through the flow path 5 can be detected at high speed. This allows transient data to be measured in detail, and equipment to be specified with good precision. Furthermore, by storing the use time of the specified equipment, a state where the specified equipment is used can be obtained, and a function of billing with respect to the specified equipment and the like can be realized.

Embodiment 7

The structure of an equipment specifying system of Embodiment 7 according to the present invention is the same as that of Embodiment 1. Thus, its description will be omitted here.

Figure 12:
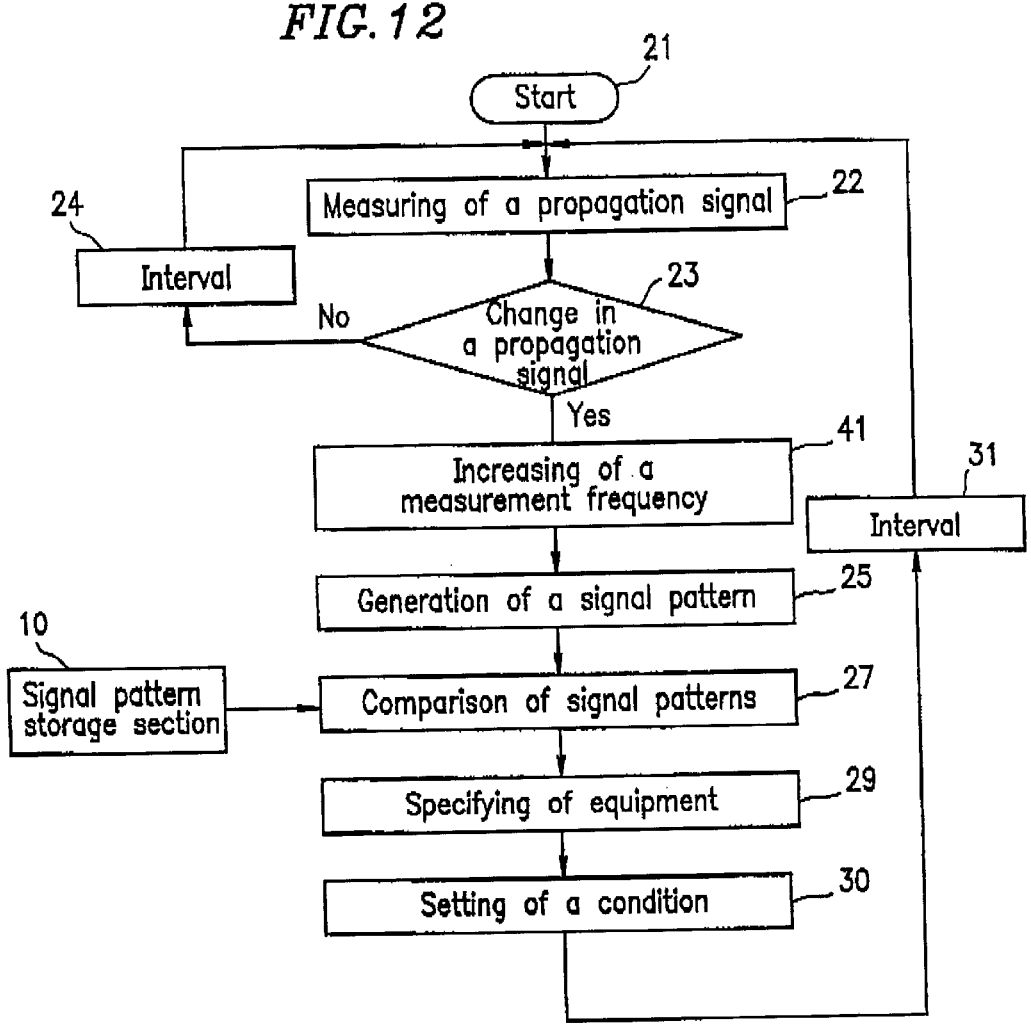
FIG. 12 is a flow chart showing a procedure of processing which is performed by a calculation section in an equipment specifying system of Embodiment 7 according to the present invention.

FIG. 12 shows a procedure of processing which is performed by the calculation section 8 in the equipment specifying system of Embodiment 7 according to the present invention. The processing shown in FIG. 12 is the same as that shown in FIG. 4 except for a measurement frequency increasing instruction 41.

The ultrasonic propagation signal measuring section 7 is controlled by the measurement frequency increasing instruction 41 so that a frequency of measuring a propagation signal is increased. Thus, a frequency of measuring a propagation signal is increased in response to the detection of a change in a propagation signal. This enables a change in flow rate of a gas flowing through the flow path 5 to be obtained more accurately, compared with the case where a propagation signal is measured at a predetermined interval.

A propagation signal representing the difference (T2−T1) between the propagation time T1 and the propagation time T2 described in Embodiment 1 may be used. Alternatively, a propagation signal representing the propagation time T1 (or a propagation signal representing the propagation time T2) described in Embodiment 4 may be used.

As described above, a frequency of measuring a propagation signal is increased in response to the detection of a change in a propagation signal, whereby transient data can be measured in more detail, and equipment can be specified with good precision.

Embodiment 8

The structure of an equipment specifying system of Embodiment 8 according to the present invention is the same as that of Embodiment 2. Thus, its description will be omitted here.

Figure 13:
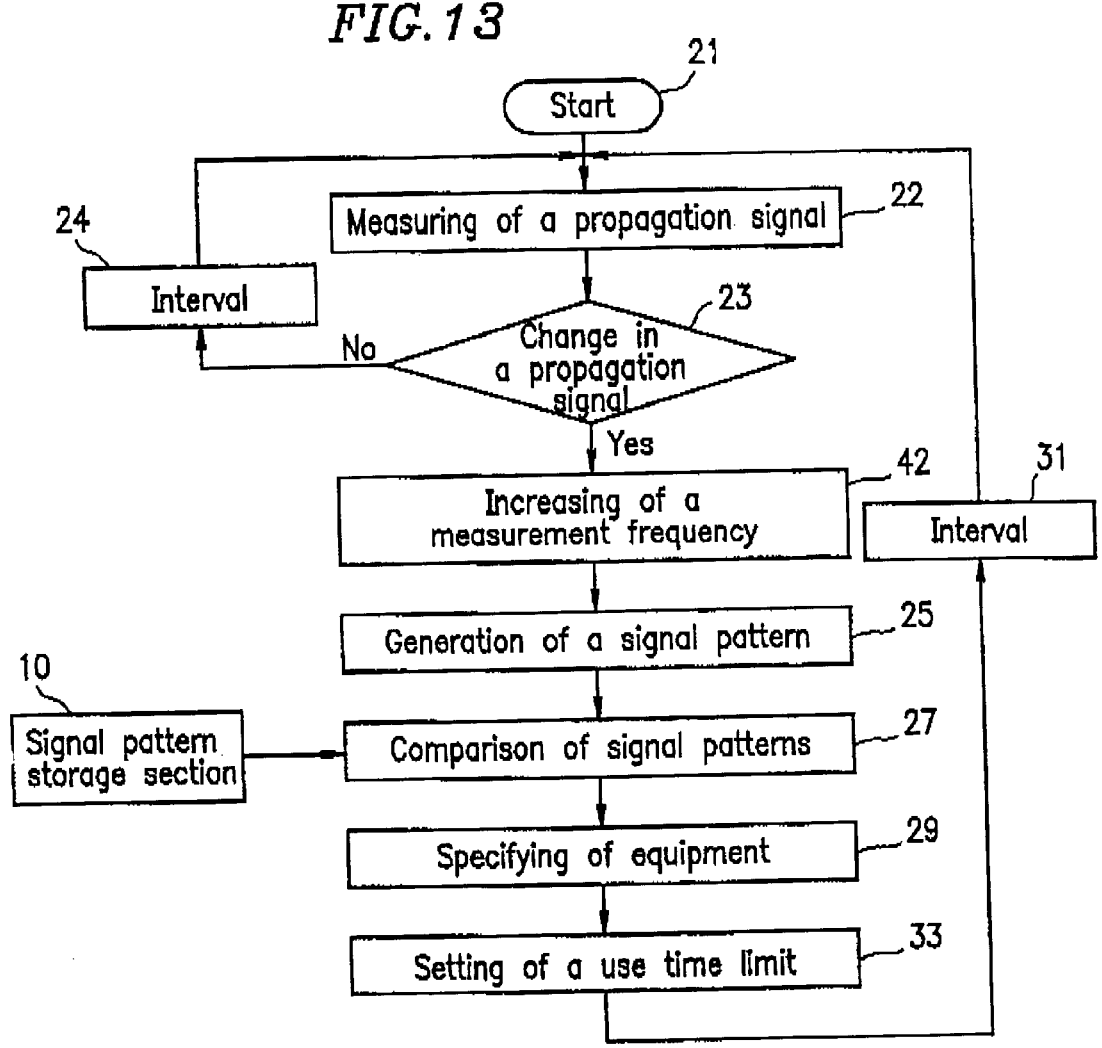
FIG. 13 is a flow chart showing a procedure of processing which is performed by a calculation section in an equipment specifying system of Embodiment 8 according to the present invention.

FIG. 13 shows a procedure of processing which is performed by the calculation section 8 in the equipment specifying system in Embodiment 8 according to the present invention. The processing shown in FIG. 13 is the same as that shown in FIG. 6 except for a measurement frequency increasing instruction 42.

The ultrasonic propagation signal measuring section 7 is controlled by the measurement frequency increasing instruction 42 so that a frequency of measuring a propagation signal is increased. Thus, a frequency of measuring a propagation signal is increased in response to the detection of a change in a propagation signal. This enables a change in flow rate of a gas flowing through the flow path 5 to be obtained more accurately, compared with the case where a propagation signal is measured at a predetermined interval.

A propagation signal representing the difference (T2−T1) between the propagation time T1 and the propagation time T2 described in Embodiment 2 may be used. Alternatively, a propagation signal representing the propagation time T1 (or a propagation signal representing the propagation time T2) described in Embodiment 5 may be used.

As described above, a frequency of measuring a propagation signal is increased in response to the detection of a change in a propagation signal, whereby transient data can be measured in more detail, and equipment can be specified with good precision. Furthermore, by setting a use time limit to the specified equipment, a safe equipment use environment can be set.

Embodiment 9

The structure of an equipment specifying system of Embodiment 9 according to the present invention in the same as that of Embodiment 3. Thus, its description will be omitted here.

Figure 14:
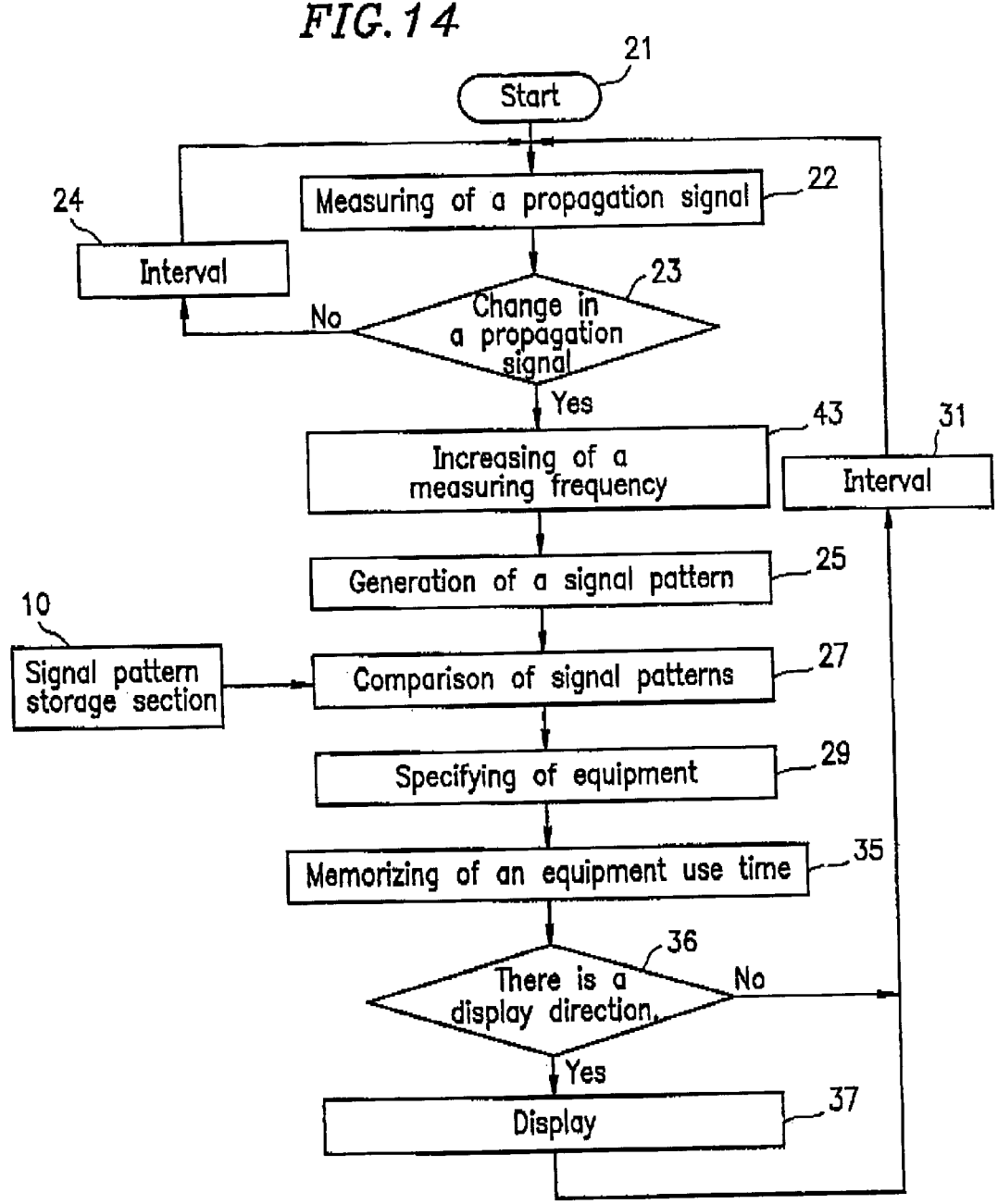
FIG. 14 is a flow chart showing a procedure of processing which is performed by a calculation section in an equipment specifying system of Embodiment 9 according to the present invention.

FIG. 14 shows a procedure of processing which is performed by the calculation section 8 in the equipment specifying system in Embodiment 9 according to the present invention. The processing shown in FIG. 14 is the same as that shown in FIG. 8 except for a measurement frequency increasing instruction 43.

The ultrasonic propagation signal measuring section 7 is controlled by the measurement frequency increasing instruction 43 so that a frequency of measuring a propagation signal is increased. Thus, a frequency of measuring a propagation signal is increased in response to the detection of a change in a propagation signal. This enables a change in flow rate of a gas flowing through the flow path 5 to be obtained more accurately, compared with the cane where a propagation signal is measured at a predetermined interval.

A propagation signal representing the difference (T2−T1) between the propagation time T1 and the propagation time T2 described in Embodiment 3 may be used. Alternatively, a propagation signal representing the propagation time T1 (or a propagation signal representing the propagation time T2) described in Embodiment 6 may be used.

As described above, a frequency of measuring a propagation signal is increased in response to the detection of a change in a propagation signal, whereby transient data can be measured in more detail, and equipment can be specified with good precision. Furthermore, by storing the use time of the specified equipment, a state where the specified equipment is used can be obtained, and a function of billing with respect to the specified equipment and the like can be realized.

In all of the above-mentioned embodiments, a signal pattern may represent a time change slope of a level of a propagation signal (e.g., a standing waveform of a propagation signal or a falling waveform of a propagation signal). Alternatively, a signal pattern may represent a level of a propagation signal or a signal duration time of a propagation signal. Alternatively, a signal pattern may represent a combination of these parameters.

A signal pattern may be written in the signal pattern storage section by using communication means. Communication means may be cable communication means or wireless communication means. A condition of the specified equipment may be set by using communication means.

Furthermore, a function of the equipment specifying system of the present invention can be incorporated into a gas meter.

INDUSTRIAL APPLICABILITY

According to the equipment specifying system of the present invention, equipment is specified by using a propagation signal based on a time during which an ultrasonic wave propagates across a flow path. It is not required to calculate a flow rate of gas flowing through the flow path. Thus, calculation processing can be simplified. This results in that a change in flow rate of a gas flowing through the flow rate can be detected at high speed. This enables a change in a transient flow of gas to be obtained and the currently used equipment to be specified with high precision.

Furthermore, by setting a use time limit to the specified equipment, a safe equipment use environment can be set.

Furthermore, by storing a use time of the specified equipment, a state where the specified equipment is used can be obtained, and a function of billing with respect to the specified equipment and the like can be realized.

Furthermore, by utilizing one of a propagation signal representing the propagation time T1 and a propagation signal representing the propagation time T2, calculation processing can be simplified compared with the case of utilizing a propagation signal representing the difference (T2−T1) between the propagation times T1 and T2. As a result, a change in flow rate of a gas flowing through the flow path can be detected at high speed.

Furthermore, by increasing a frequency of measuring a propagation signal in response to the detection of a change in a propagation signal, a change inflow rate of a gas flowing through the flow path can be obtained more accurately, compared with the case where a propagation signal is measured at a predetermined interval.

Furthermore, in the case where a signal pattern generated by the signal pattern generation section does not match with any of a plurality of signal patterns stored in the signal pattern storage section, the signal pattern comparison section can request a user to store the signal pattern in the signal pattern storage section, can automatically store the signal pattern in the signal pattern storage section, or can conduct a gas leakage check.

What is claimed is:

1. An equipment specifying system, comprising:
   a flow path for supplying gas to a plurality of pieces of equipment;
   an ultrasonic propagation signal measuring section for measuring a propagation signal based on a time during which an ultrasonic wave propagates across the flow path;
   a signal pattern generation section for generating a signal pattern based on a change in the propagation signal;
   a signal pattern storage section for previously storing a plurality of signal patterns respectively corresponding to the plurality of pieces of equipment;
   a signal pattern comparison section for comparing the signal pattern generated by the signal pattern generation section with the plurality of signal patterns previously stored in the signal pattern storage section; and
   an equipment specifying section for specifying currently used equipment among the plurality of pieces of equipment, in accordance with the comparison results obtained by the signal patter comparison section,
   wherein the ultrasonic propagation signal measuring section is controlled so that a frequency of measuring the propagation signal is increased, in response to a detection of a change in the propagation signal in both a case of a rising edge and a case of a falling edge of the propagation signal.

2. An equipment specifying system according to claim 1, wherein the equipment specifying system further includes a use time limit setting section for setting a use time limit to the specified equipment.

3. An equipment specifying system according to claim 1, wherein the equipment specifying system further includes an equipment use time storage section for storing a use time of the specified equipment.

4. An equipment specifying system according to claim 1, wherein the ultrasonic propagation signal measuring section includes a first ultrasonic transducer and a second ultrasonic transducer, and the propagation signal represents a difference (T2−T1) between a propagation time T1 during which an ultrasonic wave propagates from the first ultrasonic transducer to the second ultrasonic transducer across the flow path and a propagation time T2 during which an ultrasonic wave propagates from the second ultrasonic transducer to the first ultrasonic transducer across the flow path.

5. An equipment specifying system according to claim 1, wherein the ultrasonic propagation signal measuring section includes a first ultrasonic transducer and a second ultrasonic transducer, and the propagation signal represents one of a propagation time T1 during which an ultrasonic wave propagates from the first ultrasonic transducer to the second ultrasonic transducer across the flow path and a propagation time T2 during which an ultrasonic wave propagates from the second ultrasonic transducer to the first ultrasonic transducer across the flow path.

6. An equipment specifying system according to claim 1, wherein in a case where the signal pattern generated by the signal pattern generation section does not match with any of the plurality of signal patterns stored in the signal pattern storage section, the signal pattern comparison section requests a user to store the signal pattern generated by the signal pattern generation section in the signal pattern storage section.

7. An equipment specifying system according to claim 1, wherein in a case where the signal pattern generated by the signal pattern generation section does not match with any of the plurality of signal patterns stored in the signal pattern storage section, the signal pattern comparison section automatically stores the signal pattern generated by the signal pattern generation section in the signal pattern storage section.

8. An equipment specifying system according to claim 1, wherein in a case where the signal pattern generated by the signal pattern generation section does not match with any of the plurality of signal patterns stored in the signal pattern storage section, the signal pattern comparison section conducts a gas leakage check.

9. An equipment specifying system, comprising:
a flow path for supplying gas to a plurality of pieces of equipment;

an ultrasonic propagation signal measuring section for measuring a propagation signal based on a time during which an ultrasonic wave propagates across the flow path;

a signal pattern generation section for generating a signal pattern based on a change in the propagation signal;

a signal pattern storage section for previously storing a plurality of signal patterns respectively corresponding to the plurality of pieces of equipment;

a signal pattern comparison section for comparing the signal pattern generated by the signal pattern generation section with the plurality of signal patterns previously stored in the signal pattern storage section; and an equipment specifying section for specifying currently used equipment among the plurality of pieces of equipment, in accordance with the comparison results obtained by the signal pattern comparison section, wherein in a case where the signal pattern generated by the signal pattern generation section does not match with any of the plurality of signal patterns stored in the signal pattern storage section, the signal pattern comparison section requests a user to store the signal pattern generated by the signal pattern generation section in the signal pattern storage section.

10. An equipment specifying system, comprising:

a flow path for supplying gas to a plurality of pieces of equipment;

an ultrasonic propagation signal measuring section for measuring a propagation signal based on a time during which an ultrasonic wave propagates across the flow path;

a signal pattern generation section for generating a signal pattern based on a change in the propagation signal;

a signal pattern storage section for previously storing a plurality of signal patterns respectively corresponding to the plurality of pieces of equipment;

a signal pattern comparison section for comparing the signal pattern generated by the signal pattern generation section with the plurality of signal patterns previously stored in the signal pattern storage section; and an equipment specifying section for specifying currently used equipment among the plurality of pieces of equipment, in accordance with the comparison results obtained by the signal pattern comparison section, wherein in a case where the signal pattern generated by the signal pattern generation section does not match with any of the plurality of signal patterns stored in the signal pattern storage section, the signal pattern comparison section automatically stores the signal pattern generated by the signal pattern generation section in the signal pattern storage section.

* * * * *